US007870089B1

(12) United States Patent
Hall, III et al.

(10) Patent No.: US 7,870,089 B1
(45) Date of Patent: *Jan. 11, 2011

(54) REDUCING DUPLICATION OF EMBEDDED RESOURCES ON A NETWORK

(75) Inventors: Walter Scott Hall, III, Berryville, VA (US); Lorin R. Sutton, Jr., Woodbridge, VA (US); Craig E. Despeaux, Reston, VA (US)

(73) Assignee: AOL Inc., Dulles, VA (US)

( * ) Notice: Subject to any disclaimer, the term of this patent is extended or adjusted under 35 U.S.C. 154(b) by 2289 days.

This patent is subject to a terminal disclaimer.

(21) Appl. No.: 10/157,955

(22) Filed: May 31, 2002

Related U.S. Application Data

(60) Provisional application No. 60/334,578, filed on Dec. 3, 2001.

(51) Int. Cl.
*G06F 12/00* (2006.01)
*G06F 17/30* (2006.01)

(52) U.S. Cl. .................. 707/200; 705/50
(58) Field of Classification Search .................. 705/50, 705/65, 75; 707/200; 709/206
See application file for complete search history.

(56) References Cited

U.S. PATENT DOCUMENTS

| | | | | |
|---|---|---|---|---|
| 4,206,315 A | * | 6/1980 | Matyas et al. | 713/180 |
| 5,202,890 A | * | 4/1993 | Iketani et al. | 714/765 |
| 5,572,246 A | * | 11/1996 | Ellis et al. | 725/22 |
| 5,978,791 A | * | 11/1999 | Farber et al. | 707/640 |
| 6,018,774 A | | 1/2000 | Mayle et al. | |
| 6,058,428 A | | 5/2000 | Wang et al. | |
| 6,076,111 A | | 6/2000 | Chiu et al. | |
| 6,085,249 A | | 7/2000 | Wang et al. | |
| 6,097,389 A | | 8/2000 | Morris et al. | |
| 6,202,061 B1 | | 3/2001 | Khosla et al. | |
| 6,353,848 B1 | | 3/2002 | Morris | |
| 6,477,544 B1 | * | 11/2002 | Bolosky et al. | 1/1 |
| 6,523,115 B1 | | 2/2003 | Ono et al. | |
| 2002/0099938 A1 | * | 7/2002 | Spitz | 713/155 |
| 2002/0116508 A1 | | 8/2002 | Khan et al. | |
| 2002/0124170 A1 | * | 9/2002 | Johnson, Jr. | 713/176 |
| 2002/0184333 A1 | | 12/2002 | Appelman | 709/217 |
| 2003/0056100 A1 | * | 3/2003 | Beatson | 713/176 |
| 2004/0039912 A1 | * | 2/2004 | Borrowman et al. | 713/176 |
| 2004/0139327 A1 | * | 7/2004 | Brown et al. | 713/176 |
| 2004/0255120 A1 | * | 12/2004 | Botti et al. | 713/170 |
| 2006/0095527 A1 | * | 5/2006 | Malik | 709/206 |

OTHER PUBLICATIONS

Office Action from copending U.S. Appl. No. 10/061,270, dated Jan. 26, 2007.

(Continued)

*Primary Examiner*—Charles C Agwumezie
(74) *Attorney, Agent, or Firm*—Finnegan, Henderson, Farabow, Garrett & Dunner, LLP

(57) ABSTRACT

Systems and techniques for improving the performance of a network system having one or more sending systems and one or more receiving systems may include determining the digital signature of a received embedded digital resource, comparing the digital signature against stored digital signatures of digital resources accessible to the receiving system, and determining whether to store the received embedded digital resource and/or a location identifier for the stored version of the received embedded digital resource based on a result of the comparison.

49 Claims, 7 Drawing Sheets

OTHER PUBLICATIONS

Office Action from copending U.S. Appl. No. 10/061,270, dated Jan. 18, 2006.
Office Action from copending U.S. Appl. No. 10/061,270, dated Aug. 16, 2005.
Reply to Office Action from copending U.S. Appl. No. 10/061,270, dated Nov. 16, 2005.
Office Action from copending U.S. Appl. No. 10/061,270, dated Feb. 10, 2005.
Office Action from copending U.S. Appl. No. 10/061,270, dated Aug. 11, 2006.
Offie Action from copending U.S. Appl. No. 10/061,270, dated Jul. 16, 2007

* cited by examiner

To: johndoe@aol.com
From: Janedoe@aol.com

Subject: Family Portrait

John,

Please see the attached file, which is a picture of the kids. Aren't they adorable?

Jane portrait.jpg

Attached File

To: thomas
From: george

Subject: declaration

Thomas

How is that draft coming along? Can you email it to me when you are finished with a draft?

George

210B

General, Continental Army,
703-555-0000

Embedded File

REDUCING DUPLICATION OF EMBEDDED RESOURCES ON A NETWORK

CROSS REFERENCE TO RELATED APPLICATIONS

This application claims priority to U.S. Provisional Application No. 60/334,578, titled "REDUCING DUPLICATION OF FILES ON A NETWORK" and filed Dec. 3, 2001, and U.S. application Ser. No. 10/061,270, titled "REDUCING DUPLICATION OF FILES ON A NETWORK", and filed Feb. 4, 2002, both of which are incorporated by reference.

TECHNICAL FIELD

This description relates generally to the storage of resources in network systems.

BACKGROUND

Network systems enable communication of messages among computer systems. For example, network systems enable communication of resources over the Internet. Increases in computer and Internet usage have resulted in an increased number of resources being exchanged, which has caused network resources to become increasingly taxed and difficult to operate and maintain. To complicate matters, resources may be embedded in messages being exchanged over a network, which may lead to the dedication of additional network resources to the communication and storage of particular resources. In fact, popular resources (e.g., pictures) may be attached or embedded and sent numerous times in messages from a single source or from subsequent recipients of the messages.

SUMMARY

In one general aspect, a digital signature for a received embedded resource may be determined and that signature may be compared with stored digital signatures of digital resources accessible by a network system to determine whether to store the received embedded resource.

Implementations may include one or more of the following features. For example, the digital signature for the received resource and/or a location identifier for the resource may be stored with the stored digital signatures when the digital signature does not correspond to a stored digital signature. The location identifier may be generated when the comparison reveals that the digital signature of the embedded digital resource does not correspond to any of the stored digital signatures. The location identifier may be stored when the embedded resource is received a number of times corresponding to a storage threshold. Implementations also may include replacing the received embedded resource with a location identifier when the digital signature corresponds to at least one of the stored digital signatures.

Determining the digital signature may include applying a hashing technique to all or part of a received embedded resource. Applying the hashing technique may include applying a proprietary algorithm, the MD5 ("Message Digest 5") algorithm and/or the SHA ("Secure Host Algorithm") algorithm. Determining the digital signature also may include using one or more portions or parameters of the received embedded resource, and/or the name and/or size of the resource, to determine the digital signature.

The content of the received embedded resource and the stored resource may be verified, for example, by using all or part of the embedded resource name, the hash of the resource, the size of the embedded resource, and/or content in all or part of the embedded resource.

A counter may be used to monitor resource usage and/or redundancy. For instance, a counter may be set to an initial value when the digital signature is added to the stored digital signatures. The counter may be incremented when the digital signature of a received embedded resource corresponds to the stored digital signature. By contrast, the counter may be decremented to effectively delete or to represent deletion of an instance of the digital embedded resource. The stored embedded digital resource, the stored digital signature, and/or the location identifier may be deleted when the counter falls below an embedded resource deletion threshold, a signature deletion threshold, and a location identifier deletion threshold, respectively.

The embedded digital resource may include an electronic mail message and/or one or more attachments. The digital signature may include the digital signature of an attachment. Comparing digital signatures may include comparing digital signatures for attachments.

Determining whether to store the embedded digital resource may include determining whether the digital resource has been replaced with a location identifier a number of times per stored instance that equals or exceeds a high volume threshold. When the embedded digital resource has not been replaced a number of times per stored instance greater than or equal to the high volume threshold, the location identifier for the previously-stored instance may be retrieved. When the embedded digital resource has been replaced a number of times equal to or greater than the high volume threshold, the embedded digital resource may be stored. This may include storing a location identifier for the stored digital resource.

A received embedded resource may be separated into its constituent components using an apparatus with one or more electronic mailboxes. The electronic mailboxes may include one or more location identifiers useful in identifying content portions of electronic mail messages and/or embedded resources in those messages.

These and other aspects may be implemented by an apparatus and/or by a computer program stored on a computer readable medium such as a disc, a client device, a host device and/or a propagated signal. The apparatus that determines digital signatures may include a device physically distinct from other devices that receive the digital resource. The apparatus may also forward digital signatures and/or have a local data store of signatures.

As such, details of one or more implementations are set forth in the accompanying drawings and the description below. Other features will be apparent from the description and drawings, and from the claims.

DESCRIPTION OF DRAWINGS

Like reference symbols in the various drawings may indicate like elements.

DETAILED DESCRIPTION

For illustrative purposes, FIGS. 1-5 illustrate a network system and techniques implemented for receiving electronic resources embedded in a message and reducing their duplication. For brevity, several elements in these figures are represented as monolithic entities. However, as would be understood by one skilled in the art, implementations of these elements may include numerous interconnected computers and components that are designed to perform a set of specified operations and/or that are dedicated to a particular geographical region.

Figure 1:
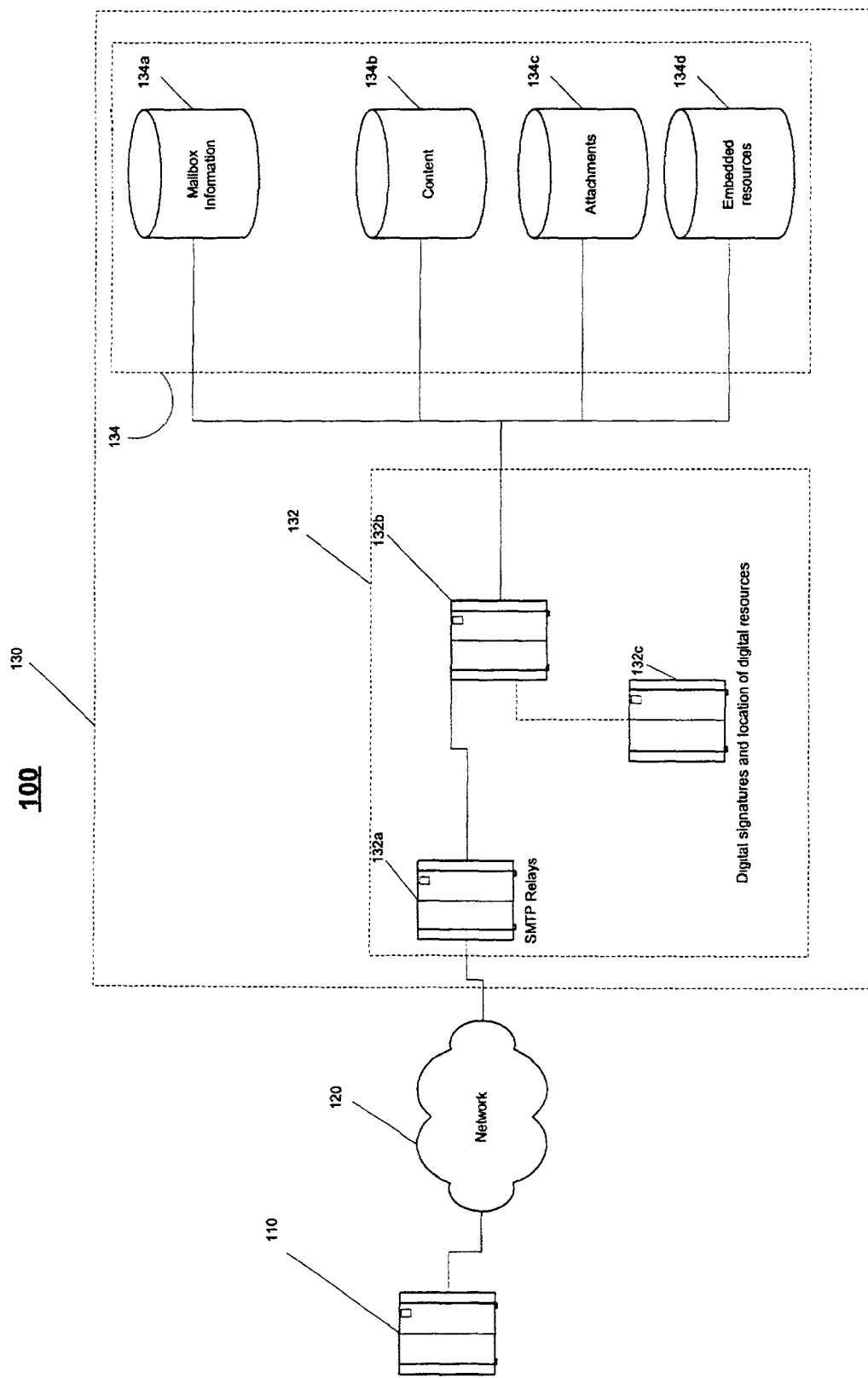
FIG. 1 is a block diagram illustrating an exemplary network system capable of reducing duplication of resources on a network.

Referring to FIG. 1, a network system 100 is structured and arranged to enable the exchange of resources between a sending system 110 and a receiving system 130 through a network 120. One or more of the elements illustrated by FIG. 1 may be operated jointly or independently by one or more organizations.

Each of the sending system 110 and the receiving system 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The sending system 110 may be structured and arranged to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the sending system 110 or the receiving system 130.

The sending system 110 may include a communication interface (not shown), such as, for example, an electronic mail gateway. For instance, the sending system 110 may include a dedicated mailing system that is implemented by specialized hardware or executed by a general purpose processor capable of running various applications, such as electronic mailer programs, and capable of employing various resource transfer protocols, such as the SMTP ("Simple Mail Transfer Protocol"). The communications interface of sending system 110 enables communications between the sending system 110 and other systems through, for example, network 120.

The network 120 typically is structured and arranged to enable direct or indirect communications between the sending system 110 and the receiving system 130. Examples of the network 120 include the Internet, the World Wide Web, WANs (Wide Area Networks), LANs (Local Area Networks), analog or digital wired and wireless telephone networks (e.g. PSTN ("Public Switched Telephone Network"), ISDN ("Integrated Services Digital Network"), or xDSL ("Digital Subscriber Loop")), radio, television, cable, satellite, and/or any other delivery mechanism for carrying data. The network 120 may include a direct link between the sending system 110 and the receiving system 130, or the network 120 may include one or more networks or subnetworks between them. Each network or subnetwork may include, for example, a wired or wireless data pathway capable of carrying and receiving data.

The receiving system 130 may be structured and arranged to form part of or include an information delivery system, such as, for example, electronic mail, the World Wide Web, an online service provider, and/or other analog or digital wired and/or wireless systems that enable communication or delivery of information.

As shown in FIG. 1, in one exemplary implementation, the receiving system 130 may include an intermediate system 132 and a user accessible system 134.

The intermediate system 132 may be structured and arranged to receive resources from one or more sending systems 110 and to distribute received resources to the user accessible system 134. These resources may include, for example, electronic mail, attachments to electronic mail, or other resources, as described below. The intermediate system 132 may include one or more SMTP relays 132a, resource segmentors 132b, and/or data stores 132c.

The SMTP relays 132a may be structured and arranged to initially receive incoming resources (e.g., electronic mail). They generally are configured to capture received SMTP traffic from a sending system 110 to avoid refusal of connections requested by the sending system 110. The SMTP relay 132a may include one or more general purpose computing devices running SMTP-receiving applications or they may be implemented to varying degrees in specialized hardware implementations that are designed to receive resources. The SMTP relays 132a also may be implemented using one or more applications residing on a device consolidating one or more resource receiving functions. In the implementation shown by FIG. 1, the SMTP relays 132a are structured and arranged to communicate with one or more resource segmentors 132b.

The resource segmentors 132b may be structured and arranged to segment a digital resource into its constituent parts including, for example, header information, content and attachments.

Figure 2:
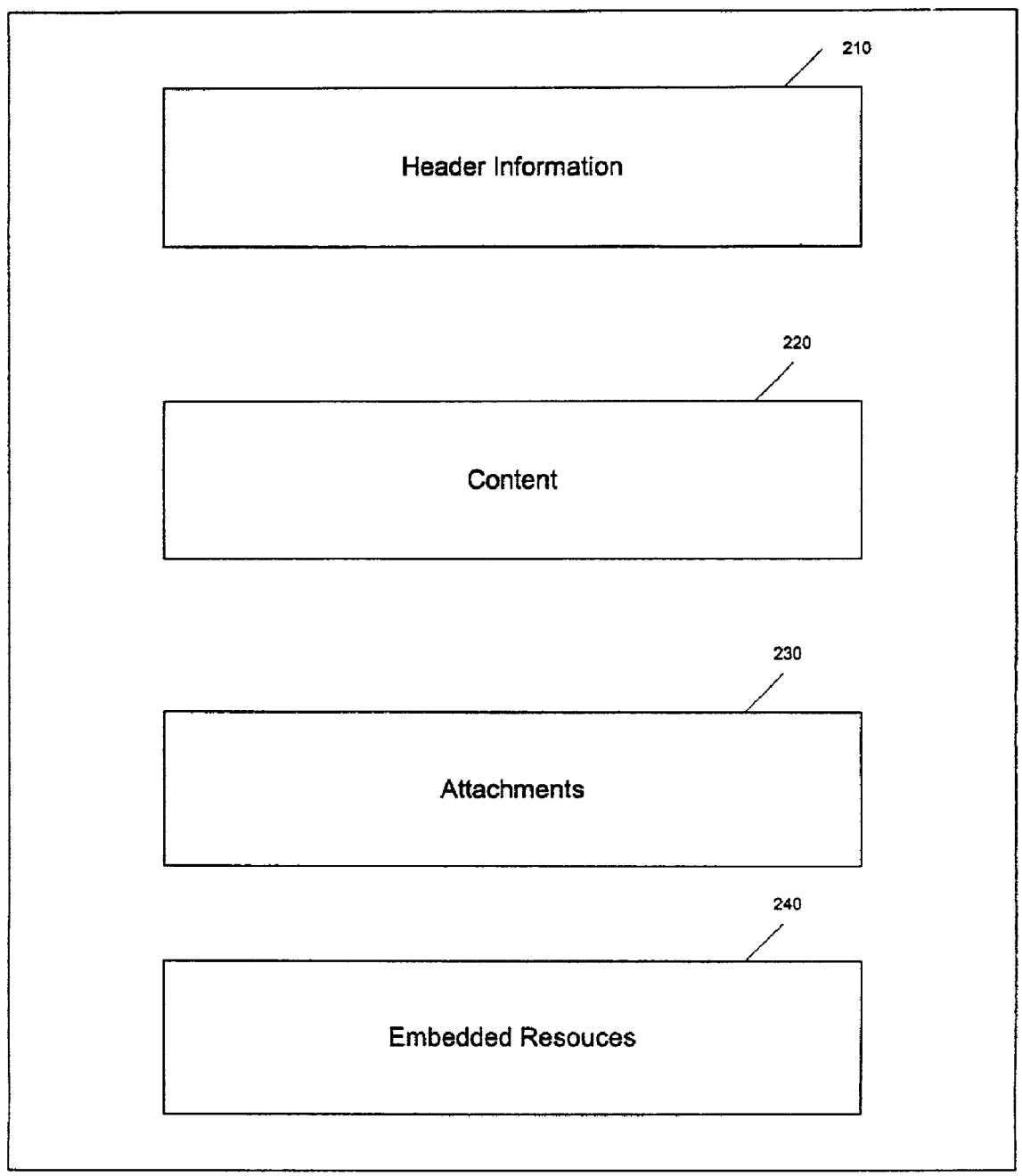
FIG. 2 is a block diagram illustrating an exemplary digital resource, which may be included in, constitute, or contain a resource exchanged in a network system, such as that illustrated by FIG. 1.

FIG. 2 illustrates a digital resource 200 that includes header information 210, content 220, attachments 230, and embedded digital resources 240. Instances of the digital resource 200 may include only a subset of one or more of these components. The digital resource 200 of FIG. 2 may represent an electronic mail message received from the sending system 110. In some implementations, the header information 210 may include identification information for the sender and/or the intended recipient. The content 220 may include a message having, for example, text formatted in plain text or other of various formats including RTF ("Rich Text Format") or other public and proprietary formatting techniques.

Generally, an embedded digital resource 240 is rendered for a user in response to and generally concurrently with user selection of a message, in contrast with an attachment that must be launched independently of a selection of a message before the attachment is rendered. For example, the content of an embedded image resource (e.g., an image generated from a JPEG or .jpg extension file) may be perceived by a message recipient as part of the message while the content of the same image file received as an attachment would remain hidden from the message recipient without further action by the message recipient.

Figure 2A:
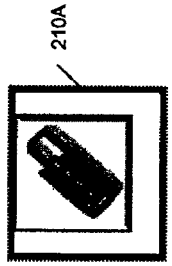
FIG. 2A illustrates an exemplary message with an attached resource.
Figure 2B:
FIG. 2B illustrates an exemplary message with an embedded resource.

FIG. 2A illustrates a display 200A generated based on a message which has an attached file 210A (appearing as a paper clip icon in a message indicating the attached file is a family portrait). In contrast, FIG. 2B illustrates a display 200B generated based on a message which has an embedded image 210B that is presented to the recipient in response to a selection of the message, without further action by the recipient appearing in the signature block of the body of the message and therefore appearing as a part of the message. Note that the embedded image 210B can be viewed without requiring the recipient to launch a separate application or interface. The attachment 230 may include electronic documentation or other resources formatted as text, images, video, audio, or otherwise.

Although the embedded resource is shown as residing in the content 220 while the attached resource is shown as residing as an attachment 230, an attached resource and an embedded resource may be very similar. For example, the same resource may appear in a first message as an attachment while appearing in a second message as an embedded resource. In one example, the difference between an attached resource and an embedded resource may be the MIME ("Multipurpose Internet Mail Extension") parameter used to describe a message for a mail processing system.

Also noteworthy is that a mail processing system may process internal and external messages differently. For example, a mail processing system may process internal messages with embedded resources by including information to reflect the embedded status of the resource, while converting into attachments embedded resources of messages originating from external sources.

The resource segmentor 132b may be structured and arranged to separate portions of the digital resource received by receiver 130 (e.g., through SMTP relays 132a) into constituent parts and to associate those constituent parts with an identifier and/or an electronic mailbox associated with an identifier related to the digital resources. The identifier may include a screen name, a user identification, an IP address or other information. In some implementations, the identifier may include authentication information, information associated with the online identification including mailbox parameters such as mailbox size, address book information, or status of mail sent or received. The identifier also may include other information, such as location identifiers (e.g. pointers, arrays, records) that identify other parts of the digital resource. The identifiers may be used to enable access to the information, content, and attachments associated with a particular identity, e.g., a sender. For instance, a user may access pointers for various digital resources (e.g., electronic mail messages) based on a personal identifier, which may be known by the user or transparent to the user.

The resource segmentor 132b may separate embedded digital resources or content of a received digital resource from other sections of that digital resource. As described with respect to FIG. 2, the content may be rendered in any of various forms, such as a text message, a letter, or other information. For example, where the content portion of an electronic message includes a letter with a picture of the sender embedded in a signature block, the picture of the sender might be stored separately from the remainder of the message.

The resource segmentor 132b also may separate one or more attachments or other embedded resources from the digital resource received. In some implementations, this may include removing information from an electronic mail message. For instance, an embedded digital resource may be separated from a received electronic mail message including that embedded digital resource, and the separated resource may be dynamically linked to one or more portions of the electronic mail message by a pointer. For example, a famous photograph may become widely distributed during a national event. As messages with the famous photograph are repeatedly exchanged, subsequent recipients may be given a link to a previously received version of the famous photograph, instead of storing an additional instance of the photograph. For example, the first five instances may be stored, while the next 1000 messages with that embedded image might be given a link to one of the five stored instances of the resource. These stored instances of the resource may be stored in the data store (e.g., storage devices 134c and 134d for attached and embedded resources) separate from the other portions of the message. Typically, the link to the attached or embedded resource includes the address at which the famous photo may be accessed. Thus, providing a user with the link comprises providing the user with an address for a previously-stored instance of the digital resource.

The data store 132c may be structured and arranged to enable searches of the digital resources or portions of digital resources separated by resource segmentor 132b against other stored digital resources stored by or capable of communicating with, and thus accessible to, the receiving system 130.

The data store 132c may be implemented by one or more general purpose computers running an operating system and an application. For example, the data store 132c may be implemented as a group of servers running a general purpose operating system and several applications that search accessed or maintained digital signatures that correspond to stored digital resources accessible to the receiving system. Implementations may include having the data store 132c operate on a special purpose device running a reduced operating system. For example, the data store 132c may include hardware designed to support large arrays of signatures and to return results of a search of those signatures.

In some implementations, the data store 132c may be structured and arranged to be able to determine a digital signature for an embedded digital resource or some portion of an electronic mail message separated by resource separator 132b. However, in other implementations, this functionality may be implemented through a separate program or process residing on a separate server that includes or communicates with the resource segmentor 132b.

The data store 132c may include processing capabilities that enable a comparison of the digital signature with stored digital signatures of digital resources accessible to the receiving system. The data store 132c may reside as a separate process or program running on a general-purpose device. Alternatively, the data store 132c may be a specialized hardware device. Other implementations may feature this capability to compare the digital signature with the digital signatures of stored digital resources residing on a shared device that performs limited functions. The device may have regional awareness of some stored digital signatures for resources received by one or several devices. Other implementations may feature a data store 132c with global awareness of all stored digital signatures. Some implementations of the data store 132c may offer global awareness of stored digital signatures residing in several systems, and also may be structured and arranged to implement a local awareness in individual systems in the event of an outage.

The digital signatures of stored digital resources accessible to the receiving system 130 may be stored as an array of values, an index, a dynamic list or other information stored locally at data store 132c, remotely in a single device, or distributed across several devices. The digital signatures may be sorted or organized for faster comparisons. The user-accessible system 134 generally is structured and arranged to enable access to resources that have been sent to the receiving system 130 or that are otherwise accessible to that system. In the implementation shown in FIG. 1, the user accessible system 134 generally includes devices that store a digital resource in its constituent parts. For instance, the user accessible system 134 may include a storage device 134*a* for electronic mailbox information (e.g., header information), a storage device 134*b* for content information, a storage device 134*c* for attachments, and a storage device 134*d* for embedded digital resources.

In this manner, the receiving system 130 may be structured and arranged to reduce duplication of received electronic resources. For example, if the intermediate system 132 determines that there are numerous instances of a resource through a comparison of digital signatures or otherwise, a location identifier (e.g., a pointer, address, reference, or link) may be stored for one or more of the instances of the resource rather than maintaining each copy of the resource. For instance, an OSP ("online storage provider") may eliminate or replace duplicate embedded resources and/or attachments to received email by storing a pointer to other instances of the same resource (e.g., embedded digital resource attachment). More generally, subsequently-received digital resources having the same resource may be stored with a location identifier that points to an instance of the resource previously received and/or stored, rather than repeatedly storing the same resource. Implementations may include storing embedded and attached resources separately and/or together. For example, a mail processing system may receive the same image in two different messages, with one as an attached resource and the other as an embedded digital resource. Notwithstanding the different encapsulating formats, one version of the resource may be stored.

Figure 3:
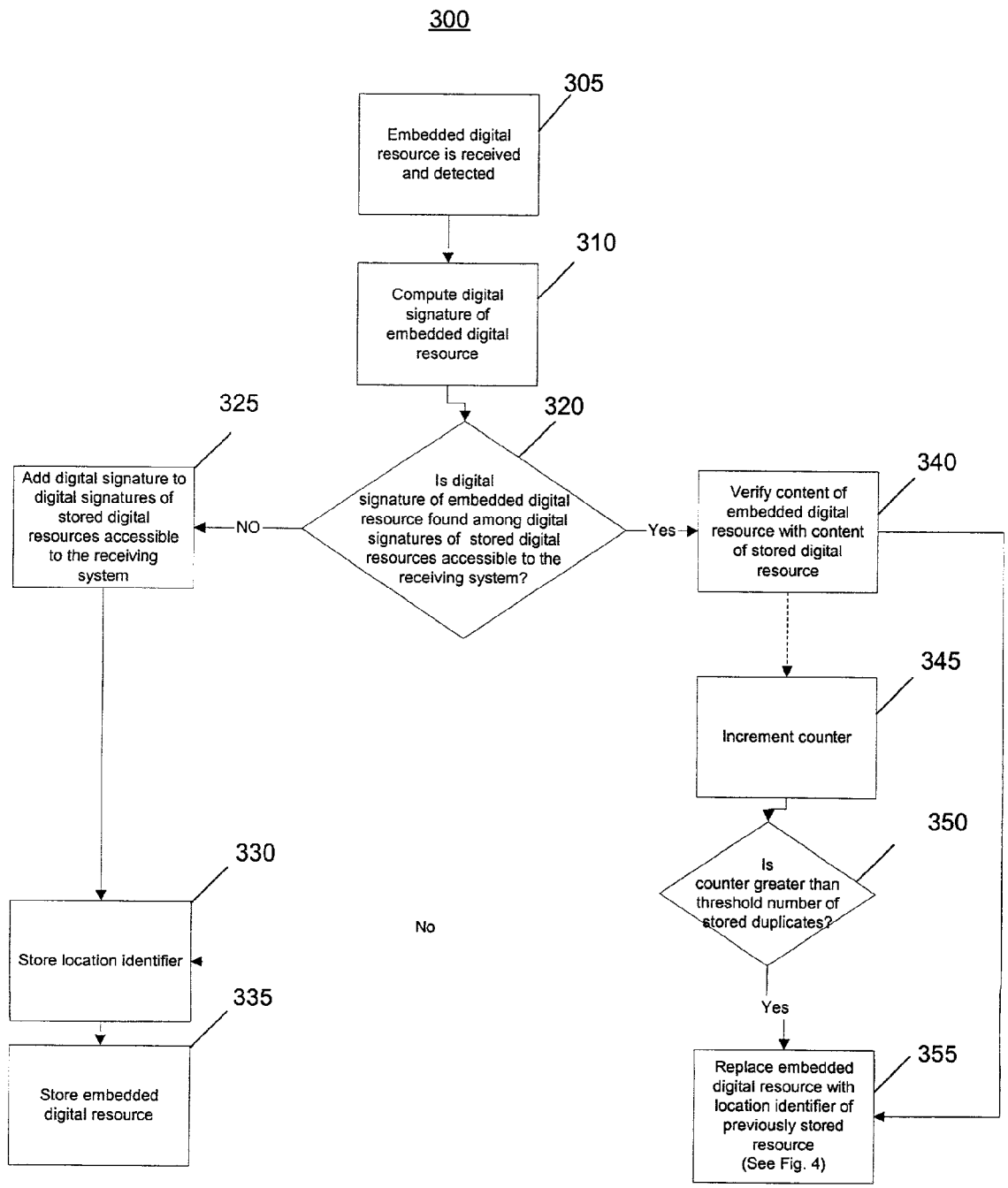
FIG. 3 is a flow chart illustrating an exemplary process for receiving a resource using a network system, such as that illustrated by FIG. 1.

FIG. 3 illustrates one implementation of a process 300 for reducing duplication of digital resources including embedded digital resources. For convenience, the process shown in FIG. 3 references particular componentry described with respect to FIG. 1. However, similar methodologies may be applied in other implementations where different componentry is used to define the structure of the system, where different portions of a message may be de-duplicated, or where the functionality is distributed differently among the components shown by FIG. 1.

Initially, an embedded and/or attached digital resource is received, for example, with a digital resource or message, and the resource is detected by, for example, receiving system 130 (step 305). For example, the embedded resource may be detected by analyzing a mail header and searching for one or more parameters that indicate that the message includes an embedded resource. In another example, a received message may be scanned for MIME extensions that indicate an embedded resource is included.

A digital signature may be computed for the received resource (step 310). Generally, a digital signature is a unique profile or fingerprint of a digital resource that identifies the digital resource. The digital signature may be computed, for example, by applying a hashing technique to all or part of the resource. The output of the hashing technique is referred to as a hash value. Typically, the hash value is substantially smaller than an associated digital resource, and is generated from an algorithm in such a way that it is extremely unlikely that different resources will produce the same hash value. Examples of hashing techniques include, but are not limited to, the MD5 ("Message Digest 5") family of algorithms and/or the SHA ("Secure Hash Algorithm") family of algorithms.

The digital signature for a resource may be computed at the receiving system, for example, at data store 132*c* of receiving system 130, or it may be computed at the sending system before the resource is communicated. In the later implementation, the digital signature may optionally be encrypted by the sending system. For instance, in one implementation, the sending system 110 determines a digital signature for a resource to be transmitted by applying a hashing technique to that digital resource. Then, the resource and the obtained hash value are encrypted and sent to the receiving system 130. Upon receiving the encrypted data from the sending system 110, the receiving system 130 decrypts the resource and the hash value using an appropriate key. To verify the integrity of the resource, the receiving system 130 may perform the same hashing technique applied by the sending system 110 and may compare the resulting hash value to the decrypted hash value. If the hash values are the same, the integrity of the resource is presumed to have been preserved across the network 120, and the hash value is used as a digital signature for the resource.

Whether the digital signature is computed by the recipient and/or the sender, the generation of the digital signature may be based on various information related to the resource. For example, a name could be used in conjunction with the resource size and a hash value. Other implementations may use a portion of those or different parameters.

In another example, a received resource or message may be separated into one or more constituent parts such that the digital signature is determined on one or more of the constituent parts. For instance, as described with respect to FIG. 2, a resource or message may be separated into header information, content, embedded digital resources, and attachments. The digital signature may be computed for one or more of the component parts, e.g., the attachments and/or the embedded digital resource.

Once the digital signature(s) are computed for resources (e.g., embedded or attached resources) of a resource or message (step 310), each digital signature is compared with other digital signatures, for example, digital signatures associated with stored digital resources accessible to the receiving system 130 (step 320). Generally, comparing the digital signature with stored digital signatures involves a comparison of digital signatures for less than all aspects of a digital resource. The digital signatures used for this comparison may include digital signatures associated with embedded and/or attached resources. In another example, the digital signature may be compared with the digital signatures for only one of embedded digital resources or attached resources. In some cases, the log of received resources might be used to compare digital signatures. For example, all resources received may be stored (if only temporarily) when a system sorts a log of received resources and signatures, so that a comparison of the digital signature against other signatures in the log may be made.

If the computed digital signature is not among the stored digital signatures (step 320), the digital signature may be added to the stored digital signatures (step 325), along with a location identifier (step 330) for the resource associated with that digital signature, which is itself stored (step 335). In one example, embedded and attached resources are stored separately and each may be used for comparison against digital signatures of received resources, separately based on the type (e.g., embedded or attached) of resource, or in combination. In another example, embedded resources may be stored in the same logical or physical storage device as attachments.

Typically, if the digital signature is found among the stored digital signatures (step 320), the resource associated with a received resource or message is replaced with a location identifier or pointer to the stored instance of the resource to avoid duplication while enabling future access to the received resource. Furthermore, an embedded digital resource may be replaced with a location identifier that corresponds to a location identifier for a resource received as an attachment to another digital resource, or vice versa. For example, as described with respect to steps 340-355, if a digital signature corresponding to a digital signature for a received embedded digital resource is found among the stored digital signatures, a location identifier corresponding to the stored digital signature may be accessed and stored as a pointer to a previously-stored instance of the resource rather than storing the received embedded digital resource redundantly.

If the digital signature is found among the stored digital signatures accessible to the receiving system, the receiving system 130 may verify that the received digital resource corresponds to the stored digital resource to ensure that the resources are the same prior to replacing the received resource with a location identifier (step 340). Examples of verifying content include, but are not limited to, examining and/or comparing attributes of the content such as its name or size, and/or data associated with the retrieved resource.

In one implementation, once the content is verified (step 340), the resource is replaced with a location identifier that points to or otherwise identifies the previously-stored instance of the duplicative received resource, thereby avoiding redundant storage of the same resource. In more complex implementations, a counter may be used to indicate the number of times a resource has been received and to limit replacement of duplicative resources based on this number (see steps 345 and 350). Specifically, when a digital signature is added to the stored digital signatures, a counter associated with the digital signature may be set to an initial value. Each time the digital signature is found in the stored digital signatures, the counter is incremented (step 345). Generally, the receiving system 130 replaces the detected resource with a location identifier after the resource or its signature is found in received resources or messages a storage threshold number of times (steps 350 and 355). In addition, the location identifier generally is stored when the counter is below the storage threshold (steps 350 and 330). For example, when the counter reaches the storage threshold (step 350), the resource may be replaced with a location identifier to avoid duplication (step 355). However, before the storage threshold is reached (step 350), the location identifier may be stored (step 330) along with the resource (step 335). That is, as will be described with respect to FIG. 4, to distribute load and/or provide some measure of redundancy, a receiving system 130 may continue to store a resource after the digital signature is found in the stored digital signatures accessible to the receiving system.

Furthermore, the counter may be used to indicate whether to delete incoming instances of the digital resources when the counter drops to or below a resource deletion threshold. For example, if several users have deleted their user copy of the resource or message (e.g., by deleting mail files in a mailbox), the counter for an associated resource may be decremented. In one implementation, when the counter reaches a signature deletion threshold, the digital signature may be removed from the stored digital signatures. In another implementation, when the counter drops below a location identifier deletion threshold, the resource may no longer be replaced for incoming digital resources or messages. In fact, in some cases, the location identifier may be removed from resources or messages having a resource associated with the stored digital signature.

Figure 4:
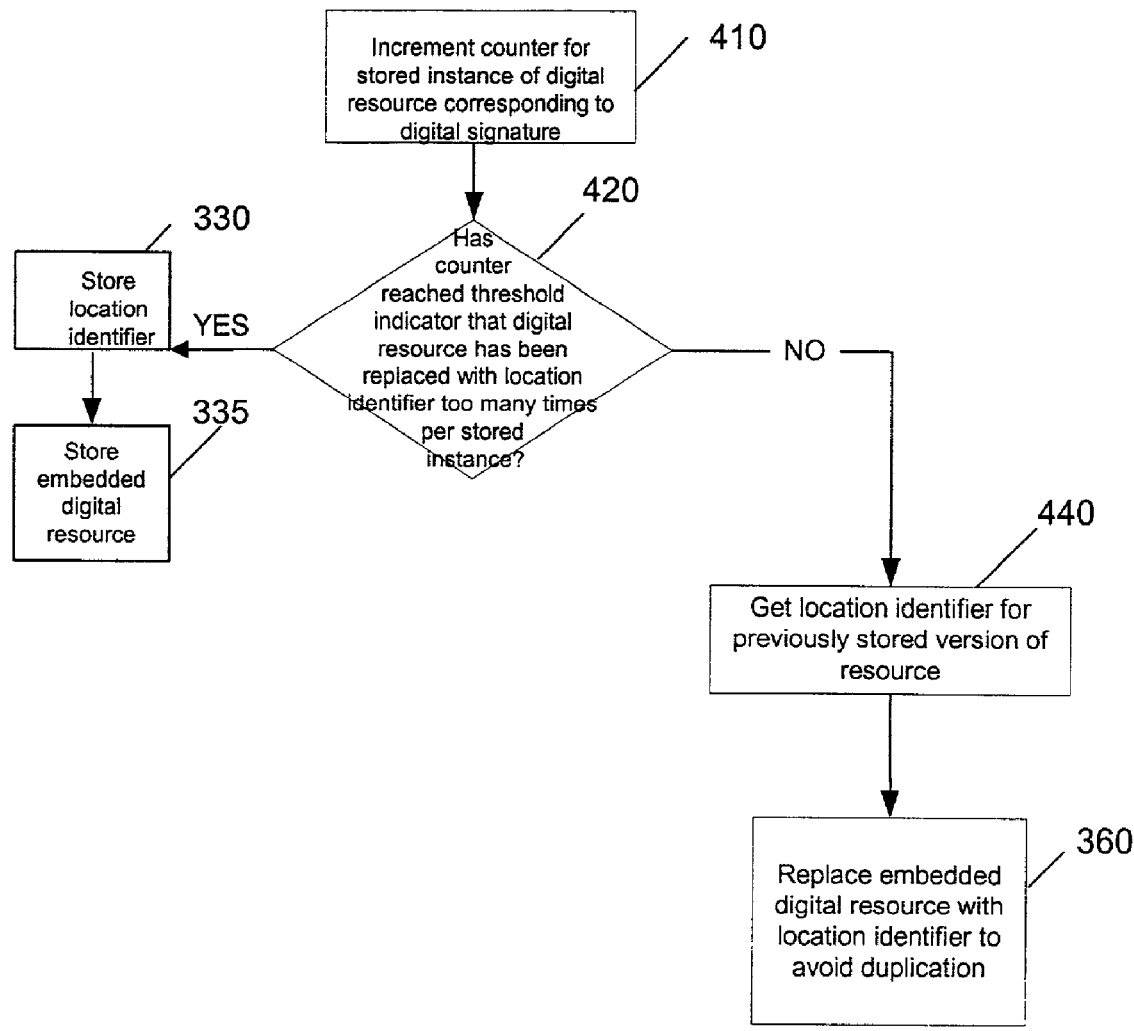
FIG. 4 is a flow chart illustrating an exemplary process for receiving and processing a resource using a network system such as that illustrated by FIG. 1, when the digital resource has been received beyond a storage threshold number of times.

FIG. 4 shows a procedure 400 that may be used to reduce duplication of resources and that includes storing more than one copy of a resource. In some cases, it is advantageous to store more than one copy of a resource on the receiving system 130. For example, several copies may be stored according to a predetermined ratio to implement load balancing. At high frequencies, the receiving system 130 may store additional instances of the resource to handle the volume of requests even after the receiving system 130 has begun to replace the resource with a location identifier. When the frequency diminishes, instances of the resource may be removed.

Procedure 400 generally is used after a receiving system 130 has determined that the digital signature of a resource is among the stored digital signatures (step 320). As such, procedure 400 may be implemented in lieu of or in addition to steps 340-350 to determine whether to store another instance of the received resource or to replace the received resource with a location identifier for a previously-stored instance of that resource.

Initially, as part of determining that the digital signature for the resource is found in the stored digital signatures, the counter is incremented (step 410).

The counter is checked to see if the number of times that the resource has been replaced with a location identifier per stored instances of the resource exceeds a high volume threshold (step 420). If this is the case, the receiving system 130 then stores the location identifier (step 330) along with the newly-stored instance of the resource (step 335). Thus, subsequently finding the digital signature in the stored digital signatures distributes shared access to the resource across more instances. If not, the receiving system 130 returns a location identifier for the previously-stored version of the resource (step 440), and replaces the resource with the location identifier to avoid duplication (step 360).

Some implementations may manage high demand conditions by storing multiple instances of the resources corresponding to a single digital signature. In high demand conditions, the multiple stored resources and/or multiple stored digital signatures are accessible to users (e.g., through a round robin assignment). For example, when multiple instances of a resource are stored, the receiving system 130 may alternate assignment of location identifiers among the stored instances.

FIGS. 3 and 4 illustrate de-duplication processes generally with respect to resources associated with incoming digital resources or messages, as they may be applied to either or both of embedded or attached resources. For example, the digital signature for an attached or embedded digital resource may be determined. This digital signature may be compared against stored digital signatures for the resource and associated counters. In fact, the same receiving system may process attached and embedded resources using the same procedures to reduce duplication of both.

Figure 5:
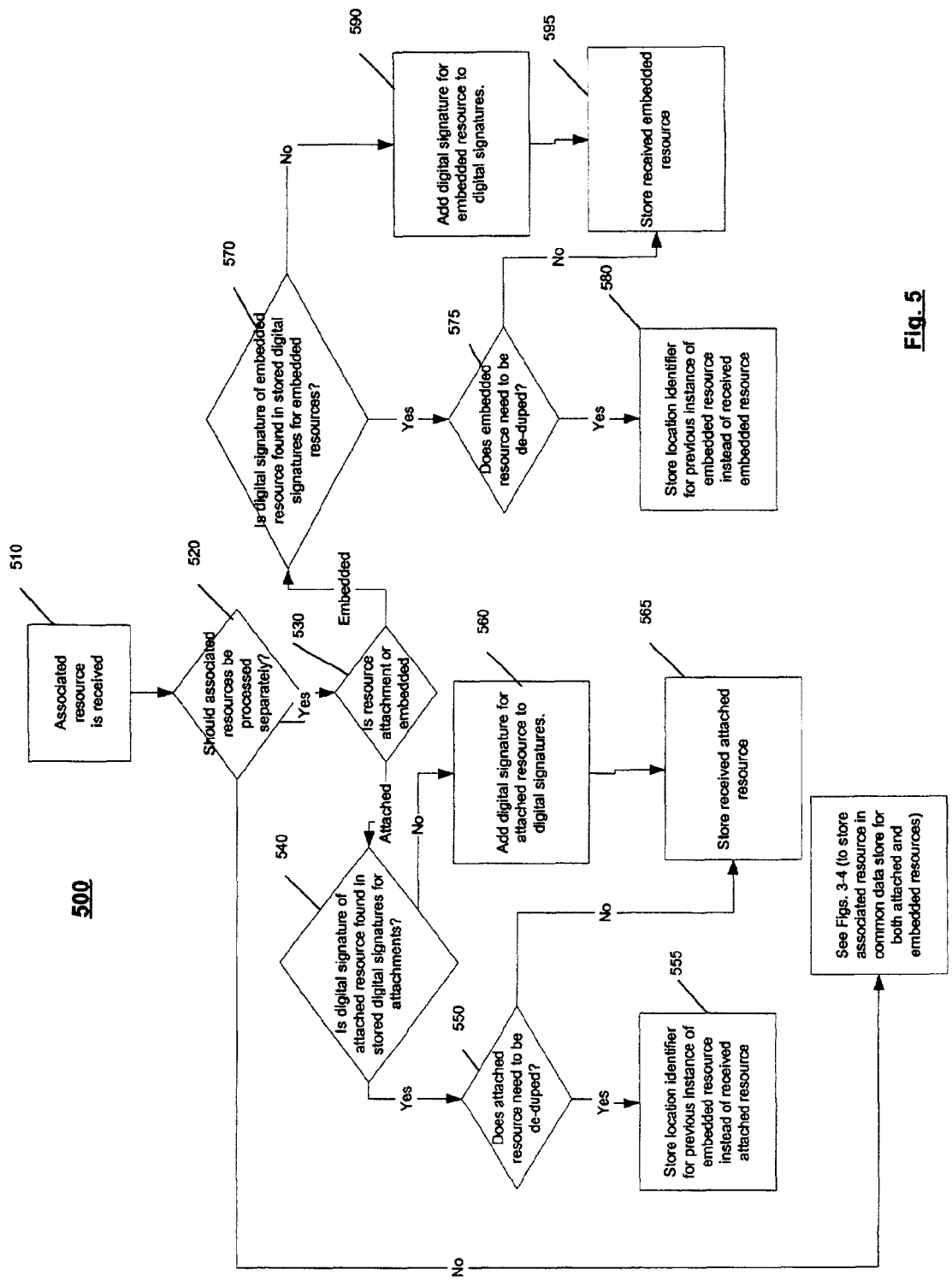
FIG. 5 is a flow chart illustrating an exemplary process for processing duplicate attached and embedded resources.

FIG. 5 illustrates a procedure 500 that a mail processing system may use to simultaneously reduce duplication of attached and embedded resources. In general, aspects of the procedure 500 relate to aspects of the procedures 300 and 400. However, the procedure 500 illustrates how the techniques described may be applied to identify a system for storing the resource when more than one type of de-duplication occurs.

Initially, an associated resource is received (step 510). Typically, an associated resource may be either an attached resource or an embedded resource. Next, the receiving system determines whether embedded resources and attachments are processed separately or in a unified manner (e.g., attached resources are stored on the same system as embedded resources) (step 520). When the associated resources are not processed separately, the receiving system processes associated resources so that the digital signature of embedded resources and attached resources may be compared against one another (see the procedures 300 and 400 of FIGS. 3 and 4).

If the associated resources are processed separately, the resource then is classified as attached or embedded (step 530). In general, determining if the resource is attached or embedded includes examining one or more parameters associated with transmission and receipt of the resource (e.g., a MIME receipt). When the associated resource is an attachment, the de-duplication process is performed to reduce duplication against other received attached resources. First, the digital signature of the attached resource is determined and compared against the stored digital signatures for attachments (step 540). When the digital signature is found, the receiving system determines whether the attached resource needs to be de-duplicated (step 550). If so, the location identifier for a previously-stored attachment is stored in place of the received attached resource (step 555). If not, the received attached resource is stored (step 565).

If the digital signature is not found in the stored digital signatures for attachments, the digital signature for the attachment is stored (step 560) along with the received attached resource (step 565).

Similarly, when the associated resource is an embedded resource, the de-duplication process is performed to reduce duplication against other received embedded resources. First, the digital signature of the embedded resource is determined and compared against the stored digital signatures for embedded resources (step 570). When the digital signature is found, the receiving system determines whether the embedded resource needs to be de-duplicated (step 575). If so, the location identifier for a previously-stored embedded resource is stored in place of the received embedded resource (step 580). If not, the received embedded resource is stored (step 595).

If the digital signature is not found in the stored digital signatures for embedded digital resources, the digital signature for the embedded resource is stored (step 590) along with the received embedded resource (step 595).

Hybrids of unified and separated storing systems may be used. For example, the digital signature of an embedded resource may only be compared with the digital signature of other embedded digital resources. However, if the digital signature of the embedded resource is found in the stored digital signatures of embedded resources, the decision for whether to store the embedded resource may use both counters for embedded and received resources (assuming instances of the resource on both storage systems). Other examples may feature various levels of integration so that storage of received resources may gradually be integrated from two or more categories of attachments towards a unified storage system.

Other implementations may initially add a digital signature to the stored digital signatures but will only replace the digital resource with a location identifier based on frequency, such as, when the digital signature is found in the stored digital signatures more than a high volume threshold number of times during a given period of time. For example, the counter that keeps track of the number of times a digital resource is received could be reset to an initial value every time the high volume threshold is reached, which then resets the counter as another instance of the resource is stored. In another example, the receiving system 130 may replace a resource with a location identifier when the resource has been received or requested at least five hundred times in a one-hour period.

In some implementations, each digital resource, the constituent parts of a digital resource or digital signatures associated with a digital resource may include an associated time stamp. For example, when a digital signature is added to the stored digital signatures, a time stamp may indicate when the digital signature was added. The time stamp may be used to keep the stored digital signatures current, and subsequent matches to the digital signature may update the time stamp. The time stamp also may be used to remove digital signatures corresponding to resources that are not frequently and/or recently requested.

The methods, devices and programs of the receiving system may be implemented in hardware or software, or a combination of both. In some implementations, the methods, devices and programs are implemented in computer programs executing on programmable computers each with at least one processor, a data storage system (including volatile and non-volatile memory and/or storage elements), at least one input device, and at least one output device. Program code is applied to input data to perform the functions described herein and generate output information. The output information is applied to one or more output devices.

The methods, devices and programs of the receiving system may be implemented as a computer program storable on a medium that can be read by a computer system, such as receiving system 130, configured to provide the functions described herein. While the methods, devices and programs are described as if executed on a separate processor, the methods, devices and programs may be implemented as a software process executed by one or more receiving systems 130.

Each program may be implemented in a high level procedural or object oriented programming language to communicate with a computer system. However, the programs can be implemented in assembly or machine language, if desired. In any case, the language may be a compiled or interpreted language.

Each such computer program may be stored on a storage media or device (e.g., ROM ("Read Only Memory") or magnetic diskette) readable by a general or special purpose programmable computer, for configuring and operating the computer when the storage media or device is read by the computer to perform the procedures described herein. The computer readable medium can also be a propagated signal. The receiving system 130 system may also be considered to be implemented as a computer-readable storage medium, configured with a computer program, where the storage medium so configured causes a computer to operate in a specific and predefined manner to perform the functions described herein.

A number of implementations have been described. Nevertheless, it will be understood that various modifications may be made. For example, although the methods, devices and programs have been described in the context of a wide area public network, the methods, devices and programs can be applied to any network (including private wide area and local area networks) in which resources transmitted from one node are transmitted to a receiving processor that can be programmed or configured as a receiving system.

Other implementations are within the scope of the following claims.

What is claimed is:

1. A method for reducing duplication of resources in an electronic messaging system, the method comprising:
   receiving an electronic message addressed to a user, the electronic message including a header portion, a content portion, and an embedded digital resource;
   storing a representation of the electronic message with at least the header portion in association with the user's mailbox information;

determining a digital signature for the embedded digital resource included in the electronic message;

accessing, from electronic storage, multiple digital signatures, each of the multiple digital signatures corresponding to an embedded digital resource included in a previous electronic message received by the electronic messaging system prior to receiving the electronic message;

comparing the digital signature for the embedded digital resource included in the electronic message against the accessed multiple digital signatures;

based on comparison results, determining whether the digital signature for the embedded digital resource included in the electronic message relates to a digital signature included in the accessed multiple digital signatures;

conditioned on determining that the digital signature for the embedded digital resource included in the electronic message relates to a digital signature included in the accessed multiple digital signatures:

identifying the related digital signature, the related digital signature corresponding to the embedded digital resource;

accessing counter data associated with the related digital signature, the counter data being based on a number of times that the embedded digital resource has been included in electronic messages received by the electronic messaging system;

determining, based on the accessed counter data, whether the embedded digital resource has been included in electronic messages received by the electronic messaging system more than a threshold number of times;

conditioned on determining that the embedded digital resource has been included in electronic messages received by the electronic messaging system more than the threshold number of times:

accessing a location identifier associated with the related digital signature, the location identifier identifying a location of a shared digital resource corresponding to the embedded digital resource, and configuring, based on the accessed location identifier, the representation of the electronic message to reference the shared digital resource corresponding to the embedded digital resource; and conditioned on determining that the embedded digital resource has not been included in electronic messages received by the electronic messaging system more than the threshold number of times:

storing a user version of the embedded digital resource in electronic storage associated with the electronic messaging system, and configuring the representation of the electronic message to access the user version of the embedded digital resource; and conditioned on determining that the digital signature for the embedded digital resource included in the electronic message does not relate to any of the accessed multiple digital signatures:

storing, in the electronic storage among the accessed multiple digital signatures, the digital signature for the embedded digital resource included in the electronic message; and setting, to an initial value, a counter associated with the stored digital signature for the embedded digital resource included in the electronic message.

2. The method of claim 1 further comprising incrementing the counter in response to receiving a second electronic message that includes a second embedded digital resource that has a second digital signature that relates to the digital signature for the embedded digital resource included in the electronic message.

3. The method of claim 1 further comprising decrementing the counter associated with the stored digital signature for the embedded digital resource included in the electronic message in response to a user deleting an electronic message that included, when received by the electronic messaging system, a digital resource having a digital signature that relates to the stored digital signature for the embedded digital resource included in the electronic message.

4. The method of claim 3 further comprising:

storing, in electronic storage, the embedded digital resource included in the electronic message as a shared digital resource;

determining whether the counter associated with the stored digital signature for the embedded digital resource included in the electronic message is below a resource deletion threshold, and in response to determining that the counter associated with the stored digital signature for the embedded digital resource included in the electronic message is below the file deletion threshold:

deleting the shared digital resource corresponding to the embedded digital resource included in the electronic message, and maintaining, in electronic storage, the stored digital signature for the embedded digital resource included in the electronic message among the multiple digital signatures accessed to compare to digital signatures of embedded digital resources included in received electronic messages.

5. The method of claim 3 further comprising:

determining whether the counter associated with the stored digital signature for the embedded digital resource included in the electronic message is below a signature deletion threshold, and in response to determining that the counter associated with the stored digital signature for the embedded digital resource included in the electronic message is below the signature deletion threshold, removing the stored digital signature for the embedded digital resource included in the electronic message from the stored digital signatures accessed to compare to digital signatures of embedded digital resources included in received electronic messages.

6. The method of claim 3 further comprising:

storing, in the electronic storage, the embedded digital resource included in the electronic message as a shared digital resource, determining a location identifier for the shared digital resource corresponding to the embedded digital resource included in the electronic message, associating the location identifier for the shared digital resource corresponding to the embedded digital resource included in the electronic message with the stored digital signature for the embedded digital resource included in the electronic message, determining whether the counter associated with the stored digital signature for the embedded digital resource included in the electronic message is below a location identifier deletion threshold, and in response to determining that the counter associated with the stored digital signature for the embedded digital resource included in the electronic message is below the location identifier deletion threshold:
  deleting the location identifier associated with the stored digital signature for the embedded digital resource included in the electronic message, and
  maintaining, in electronic storage, the stored digital signature for the embedded digital resource included in the electronic message among the multiple digital signatures accessed to compare to digital signatures of embedded digital resources included in received electronic messages.

7. A method for reducing duplication of resources in an electronic messaging system, the method comprising:
  receiving an electronic message addressed to a user, the electronic message including an embedded digital resource;
  storing a representation of the electronic message;
  determining a digital signature for the embedded digital resource included in the electronic message;
  accessing, from electronic storage, multiple digital signatures, each of the multiple digital signatures corresponding to an embedded digital resource included in a previous electronic message received by the electronic messaging system prior to receiving the electronic message;
  comparing the digital signature for the embedded digital resource included in the electronic message against the accessed multiple stored digital signatures;
  based on comparison results, identifying a digital signature included in the accessed multiple digital signatures that relates to the digital signature for the embedded digital resource included in the electronic message;
  accessing frequency data associated with the identified digital signature, the frequency data indicating the frequency with which electronic messages that include the embedded digital resource have been received by the electronic messaging system;
  determining, based on the accessed frequency data, whether the frequency with which electronic messages that include the embedded digital resource have been received by the electronic messaging system is more than a threshold frequency; and
  conditioned on determining that the frequency with which electronic messages that include the embedded digital resource have been received is more than the threshold frequency:
    accessing a location identifier associated with the identified digital signature, the location identifier identifying a location of a shared digital resource corresponding to the embedded digital resource, and
    configuring, based on the accessed location identifier, the representation of the electronic message to reference the shared digital resource corresponding to the embedded digital resource; and
  conditioned on determining that the frequency with which electronic messages that include the embedded digital resource have been received is less than the threshold frequency:
    storing a user version of the embedded digital resource in electronic storage associated with the electronic messaging system, and
    configuring the representation of the electronic message to access the user version of the embedded digital resource.

8. The method of claim 7 wherein accessing frequency data associated with the identified digital signature, the frequency data indicating the frequency with which electronic messages that include the embedded digital resource have been received by the electronic messaging system includes accessing frequency data indicating a number of times electronic messages that include the embedded digital resource have been received by the electronic messaging system during a given period of time.

9. A method for reducing duplication of resources in an electronic messaging system, the method comprising:
  receiving an electronic message addressed to a user, the electronic message including a header portion, a content portion, and an embedded digital resource;
  storing a representation of the electronic message with at least the header portion in association with the user's mailbox information;
  determining a digital signature for the embedded digital resource included in the electronic message;
  accessing, from electronic storage, multiple digital signatures, each of the multiple digital signatures corresponding to an embedded digital resource included in a previous electronic message received by the electronic messaging system prior to receiving the electronic message;
  comparing the digital signature for the embedded digital resource included in the electronic message against the accessed multiple digital signatures;
  based on comparison results, determining whether the digital signature for the embedded digital resource included in the electronic message relates to a digital signature included in the accessed multiple digital signatures;
  conditioned on determining that the digital signature for the embedded digital resource included in the electronic message relates to a digital signature included in the accessed multiple digital signatures:
    identifying the related digital signature, the related digital signature corresponding to the embedded digital resource;
    accessing counter data associated with the related digital signature, the counter data being based on a number of times that the embedded digital resource has been included in electronic messages received by the electronic messaging system;
    determining, based on the accessed counter data, whether the embedded digital resource has been included in electronic messages received by the electronic messaging system more than a threshold number of times;
    conditioned on determining that the embedded digital resource has been included in electronic messages received by the electronic messaging system more than the threshold number of times:
      accessing a location identifier associated with the related digital signature, the location identifier identifying a location of a shared digital resource corresponding to the embedded digital resource, and
      configuring, based on the accessed location identifier, the representation of the electronic message to reference the shared digital resource corresponding to the embedded digital resource; and
    conditioned on determining that the embedded digital resource has not been included in electronic messages received by the electronic messaging system more than the threshold number of times:
      storing a user version of the embedded digital resource in electronic storage associated with the electronic messaging system, and configuring the representation of the electronic message to access the user version of the embedded digital resource.

10. The method of claim 9 wherein the embedded digital resource comprises an embedded resource in an electronic mail message.

11. The method of claim 9 wherein:

accessing counter data associated with the related digital signature, the counter data being based on a number of times that the embedded digital resource has been included in electronic messages received by the electronic messaging system includes accessing a counter associated with the related digital signature, the counter being configured to count the number of times that the embedded digital resource has been included in electronic messages received by the electronic messaging system; and determining, based on the accessed counter data, whether the embedded digital resource has been included in electronic messages received by the electronic messaging system more than the threshold number of times includes determining whether a value of the counter associated with the related digital signature is greater than the threshold number of times.

12. The method of claim 9 further comprising conditioned on determining that the digital signature for the embedded digital resource included in the electronic message does not relate to any of the accessed multiple digital signatures:

storing, in the electronic storage among the accessed multiple digital signatures, the digital signature for the embedded digital resource included in the electronic message.

13. The method of claim 9 further comprising storing a location identifier for a previously-stored digital resource corresponding to the related digital signature.

14. The method of claim 9 wherein determining the digital signature includes applying a hashing technique to all or part of all of the embedded digital resource.

15. The method of claim 9 wherein the digital signature is determined from part of the embedded digital resource.

16. The method of claim 9 wherein the digital signature is determined based on a name of the embedded digital resource.

17. The method of claim 9 wherein determining the digital signature is determined based on a size of the embedded digital resource.

18. The method of claim 9 further comprising verifying that the embedded digital resource included in the electronic message corresponds to the shared digital resource corresponding to the related digital signature.

19. The method of claim 9 wherein determining, based on the accessed counter data, whether the embedded digital resource has been included in electronic messages received by the electronic messaging system more than the threshold number of times includes determining, based on the accessed counter data, whether the embedded digital resource has been included in electronic messages received by the electronic messaging system more than the threshold number of times, the threshold number of times being greater than two.

20. The method of claim 9 further comprising processing the electronic message to separate the header portion, the content portion, and the embedded digital resource.

21. The method of claim 9 wherein the shared digital resources are stored in an intermediate storage portion of the electronic messaging system.

22. The method of claim 9 wherein the user's storage portion of the electronic messaging system includes a portion for storing mailbox information, a portion for storing content included in electronic messages, and a portion for storing embedded digital resources.

23. The method of claim 10 wherein the embedded digital resource includes an attachment in an electronic mail message.

24. The method of claim 13 further comprising not redundantly storing the embedded digital resource included in the electronic message.

25. The method of claim 14 wherein applying the hashing technique includes applying an MD5 algorithm to the embedded digital resource.

26. The method of claim 14 wherein applying the hashing technique includes applying a version of an SHA algorithm to the embedded digital resource.

27. The method of claim 18 wherein verifying that the embedded digital resource included in the electronic message corresponds to the shared digital resource corresponding to the related digital signature includes verifying that at least a portion of a name of the embedded digital resource included in the electronic message corresponds to at least a portion of a name of the shared digital resource.

28. The method of claim 18 wherein verifying that the embedded digital resource included in the electronic message corresponds to the shared digital resource corresponding to the related digital signature includes verifying based on a size of the shared digital resource and a size of the embedded digital resource included in the electronic message.

29. The method of claim 18 wherein verifying that the embedded digital resource included in the electronic message corresponds to the shared digital resource corresponding to the related digital signature includes verifying based on a hash performed on the shared digital resource.

30. The method of claim 18 wherein verifying that the embedded digital resource included in the electronic message corresponds to the shared digital resource corresponding to the related digital signature includes verifying based on data in the shared digital resource.

31. The method of claim 23 wherein determining the digital signature for the digital resource includes determining the digital signature of the attachment.

32. A system comprising:

a processor; and memory encoded with executable instructions that, when executed by the processor, operate to cause the processor to perform operations comprising:

receiving an electronic message addressed to a user, the electronic message including a header portion, a content portion, and an embedded digital resource;

storing a representation of the electronic message with at least the header portion in association with the user's mailbox information;

determining a digital signature for the embedded digital resource included in the electronic message;

accessing, from electronic storage, multiple digital signatures, each of the multiple digital signatures corresponding to an embedded digital resource included in a previous electronic message received by the electronic messaging system prior to receiving the electronic message;

comparing the digital signature for the embedded digital resource included in the electronic message against the accessed multiple digital signatures;

based on comparison results, determining whether the digital signature for the embedded digital resource included in the electronic message relates to a digital signature included in the accessed multiple digital signatures;

conditioned on determining that the digital signature for the embedded digital resource included in the electronic message relates to a digital signature included in the accessed multiple digital signatures:

identifying the related digital signature, the related digital signature corresponding to the embedded digital resource;

accessing counter data associated with the related digital signature, the counter data being based on a number of times that the embedded digital resource has been included in electronic messages received by the electronic messaging system;

determining, based on the accessed counter data, whether the embedded digital resource has been included in electronic messages received by the electronic messaging system more than a threshold number of times;

conditioned on determining that the embedded digital resource has been included in electronic messages received by the electronic messaging system more than the threshold number of times:

accessing a location identifier associated with the related digital signature, the location identifier identifying a location of a shared digital resource corresponding to the embedded digital resource, and configuring, based on the accessed location identifier, the representation of the electronic message to reference the shared digital resource corresponding to the embedded digital resource; and conditioned on determining that the embedded digital resource has not been included in electronic messages received by the electronic messaging system more than the threshold number of times:

storing a user version of the embedded digital resource in electronic storage associated with the electronic messaging system, and configuring the representation of the electronic message to access the user version of the embedded digital resource.

33. The system of claim 32 wherein the operations further comprise:

conditioned on determining that the digital signature for the embedded digital resource included in the electronic message does not relate to any of the accessed multiple digital signatures:

storing, in the electronic storage among the accessed multiple digital signatures, the digital signature for the embedded digital resource included in the electronic message; and setting, to an initial value, a counter associated with the stored digital signature for the embedded digital resource included in the electronic message.

34. The system of claim 32 wherein determining, based on the accessed counter data, whether the embedded digital resource has been included in electronic messages received by the electronic messaging system more than the threshold number of times includes determining, based on the accessed counter data, whether the embedded digital resource has been included in electronic messages received by the electronic messaging system more than the threshold number of times, the threshold number of times being greater than two.

35. The system of claim 32 wherein:

accessing counter data associated with the related digital signature, the counter data being based on a number of times that the embedded digital resource has been included in electronic messages received by the electronic messaging system includes accessing a counter associated with the related digital signature, the counter being configured to count the number of times that the embedded digital resource has been included in electronic messages received by the electronic messaging system; and determining, based on the accessed counter data, whether the embedded digital resource has been included in electronic messages received by the electronic messaging system more than the threshold number of times includes determining whether a value of the counter associated with the related digital signature is greater than the threshold number of times.

36. The system of claim 33 wherein the operations further comprise incrementing the counter in response to receiving a second electronic message that includes a second embedded digital resource that has a second digital signature that relates to the digital signature for the embedded digital resource included in the electronic message.

37. The system of claim 33 wherein the operations further comprise decrementing the counter associated with the stored digital signature for the embedded digital resource included in the electronic message in response to a user deleting an electronic message that included, when received by the electronic messaging system, a digital resource having a digital signature that relates to the stored digital signature for the embedded digital resource included in the electronic message.

38. The system of claim 37 wherein the operations further comprise:

storing, in electronic storage, the embedded digital resource included in the electronic message as a shared digital resource;

determining whether the counter associated with the stored digital signature for the embedded digital resource included in the electronic message is below a resource deletion threshold, and in response to determining that the counter associated with the stored digital signature for the embedded digital resource included in the electronic message is below the file deletion threshold:

deleting the shared digital resource corresponding to the embedded digital resource included in the electronic message, and maintaining, in electronic storage, the stored digital signature for the embedded digital resource included in the electronic message among the multiple digital signatures accessed to compare to digital signatures of embedded digital resources included in received electronic messages.

39. The system of claim 37 wherein the operations further comprise:

determining whether the counter associated with the stored digital signature for the embedded digital resource included in the electronic message is below a signature deletion threshold, and in response to determining that the counter associated with the stored digital signature for the embedded digital resource included in the electronic message is below the signature deletion threshold, removing the stored digital signature for the embedded digital resource included in the electronic message from the stored digital signatures accessed to compare to digital signatures of embedded digital resources included in received electronic messages.

40. The system of claim 37 wherein the operations further comprise:
storing, in the electronic storage, the embedded digital resource included in the electronic message as a shared digital resource,
determining a location identifier for the shared digital resource corresponding to the embedded digital resource included in the electronic message,
associating the location identifier for the shared digital resource corresponding to the embedded digital resource included in the electronic message with the stored digital signature for the embedded digital resource included in the electronic message,
determining whether the counter associated with the stored digital signature for the embedded digital resource included in the electronic message is below a location identifier deletion threshold, and
in response to determining that the counter associated with the stored digital signature for the embedded digital resource included in the electronic message is below the location identifier deletion threshold:
deleting the location identifier associated with the stored digital signature for the embedded digital resource included in the electronic message, and
maintaining, in electronic storage, the stored digital signature for the embedded digital resource included in the electronic message among the multiple digital signatures accessed to compare to digital signatures of embedded digital resources included in received electronic messages.

41. A computer-readable storage medium encoded with executable instructions that, when executed, operate to cause a computer to perform operations comprising:
receiving an electronic message addressed to a user, the electronic message including a header portion, a content portion, and an embedded digital resource;
storing a representation of the electronic message with at least the header portion in association with the user's mailbox information;
determining a digital signature for the embedded digital resource included in the electronic message;
accessing, from electronic storage, multiple digital signatures, each of the multiple digital signatures corresponding to an embedded digital resource included in a previous electronic message received by the electronic messaging system prior to receiving the electronic message;
comparing the digital signature for the embedded digital resource included in the electronic message against the accessed multiple digital signatures;
based on comparison results, determining whether the digital signature for the embedded digital resource included in the electronic message relates to a digital signature included in the accessed multiple digital signatures;
conditioned on determining that the digital signature for the embedded digital resource included in the electronic message relates to a digital signature included in the accessed multiple digital signatures:
identifying the related digital signature, the related digital signature corresponding to the embedded digital resource;
accessing counter data associated with the related digital signature, the counter data being based on a number of times that the embedded digital resource has been included in electronic messages received by the electronic messaging system;
determining, based on the accessed counter data, whether the embedded digital resource has been included in electronic messages received by the electronic messaging system more than a threshold number of times;
conditioned on determining that the embedded digital resource has been included in electronic messages received by the electronic messaging system more than the threshold number of times:
accessing a location identifier associated with the related digital signature, the location identifier identifying a location of a shared digital resource corresponding to the embedded digital resource, and
configuring, based on the accessed location identifier, the representation of the electronic message to reference the shared digital resource corresponding to the embedded digital resource; and
conditioned on determining that the embedded digital resource has not been included in electronic messages received by the electronic messaging system more than the threshold number of times:
storing a user version of the embedded digital resource in electronic storage associated with the electronic messaging system, and
configuring the representation of the electronic message to access the user version of the embedded digital resource.

42. The computer-readable storage medium of claim 41 wherein the operations further comprise:
conditioned on determining that the digital signature for the embedded digital resource included in the electronic message does not relate to any of the accessed multiple digital signatures:
storing, in the electronic storage among the accessed multiple digital signatures, the digital signature for the embedded digital resource included in the electronic message; and
setting, to an initial value, a counter associated with the stored digital signature for the embedded digital resource included in the electronic message.

43. The computer-readable storage medium of claim 41 wherein determining, based on the accessed counter data, whether the embedded digital resource has been included in electronic messages received by the electronic messaging system more than the threshold number of times includes determining, based on the accessed counter data, whether the embedded digital resource has been included in electronic messages received by the electronic messaging system more than the threshold number of times, the threshold number of times being greater than two.

44. The computer-readable storage medium of claim 41 wherein:
accessing counter data associated with the related digital signature, the counter data being based on a number of times that the embedded digital resource has been included in electronic messages received by the electronic messaging system includes accessing a counter associated with the related digital signature, the counter being configured to count the number of times that the embedded digital resource has been included in electronic messages received by the electronic messaging system; and determining, based on the accessed counter data, whether the embedded digital resource has been included in electronic messages received by the electronic messaging system more than the threshold number of times includes determining whether a value of the counter associated with the related digital signature is greater than the threshold number of times.

45. The computer-readable storage medium of claim 42 wherein the operations further comprise incrementing the counter in response to receiving a second electronic message that includes a second embedded digital resource that has a second digital signature that relates to the digital signature for the embedded digital resource included in the electronic message.

46. The computer-readable storage medium of claim 42 wherein the operations further comprise decrementing the counter associated with the stored digital signature for the embedded digital resource included in the electronic message in response to a user deleting an electronic message that included, when received by the electronic messaging system, a digital resource having a digital signature that relates to the stored digital signature for the embedded digital resource included in the electronic message.

47. The computer-readable storage medium of claim 46 wherein the operations further comprise:

storing, in electronic storage, the embedded digital resource included in the electronic message as a shared digital resource;

determining whether the counter associated with the stored digital signature for the embedded digital resource included in the electronic message is below a resource deletion threshold, and in response to determining that the counter associated with the stored digital signature for the embedded digital resource included in the electronic message is below the file deletion threshold:

deleting the shared digital resource corresponding to the embedded digital resource included in the electronic message, and maintaining, in electronic storage, the stored digital signature for the embedded digital resource included in the electronic message among the multiple digital signatures accessed to compare to digital signatures of embedded digital resources included in received electronic messages.

48. The computer-readable storage medium of claim 46 wherein the operations further comprise:

determining whether the counter associated with the stored digital signature for the embedded digital resource included in the electronic message is below a signature deletion threshold, and in response to determining that the counter associated with the stored digital signature for the embedded digital resource included in the electronic message is below the signature deletion threshold, removing the stored digital signature for the embedded digital resource included in the electronic message from the stored digital signatures accessed to compare to digital signatures of embedded digital resources included in received electronic messages.

49. The computer-readable storage medium of claim 46 wherein the operations further comprise:

storing, in the electronic storage, the embedded digital resource included in the electronic message as a shared digital resource, determining a location identifier for the shared digital resource corresponding to the embedded digital resource included in the electronic message, associating the location identifier for the shared digital resource corresponding to the embedded digital resource included in the electronic message with the stored digital signature for the embedded digital resource included in the electronic message, determining whether the counter associated with the stored digital signature for the embedded digital resource included in the electronic message is below a location identifier deletion threshold, and in response to determining that the counter associated with the stored digital signature for the embedded digital resource included in the electronic message is below the location identifier deletion threshold:

deleting the location identifier associated with the stored digital signature for the embedded digital resource included in the electronic message, and maintaining, in electronic storage, the stored digital signature for the embedded digital resource included in the electronic message among the multiple digital signatures accessed to compare to digital signatures of embedded digital resources included in received electronic messages.

\* \* \* \* \*